United States Patent [19]

Ishikawa

[11] Patent Number: 5,475,671
[45] Date of Patent: Dec. 12, 1995

[54] OPTICAL INFORMATION DETECTION CIRCUIT FOR DETECTING PHOTOELECTRICALLY CONVERTED SIGNAL FROM LIGHT RECEIVING MEANS COMPRISING AT LEAST TWO LIGHT RECEIVING ELEMENTS

[75] Inventor: Kazumasa Ishikawa, Hachioji, Japan

[73] Assignee: Olympus Optical Co., Ltd., Tokyo, Japan

[21] Appl. No.: 215,474

[22] Filed: Mar. 21, 1994

[30] Foreign Application Priority Data

Mar. 24, 1993 [JP] Japan .................. 5-065599

[51] Int. Cl.⁶ ............................. G11B 7/13
[52] U.S. Cl. .................. 369/120; 369/124; 250/201.5
[58] Field of Search .................. 369/48, 124, 120, 369/44.41, 44.32; 250/201.5

[56] References Cited

U.S. PATENT DOCUMENTS

| | | | |
|---|---|---|---|
| 4,721,850 | 1/1988 | Sakai et al. | 250/201.5 |
| 5,202,870 | 4/1993 | Aoki et al. | 369/124 |
| 5,229,984 | 7/1993 | Konno et al. | 369/44.41 |

FOREIGN PATENT DOCUMENTS 2-206048  8/1990  Japan .

Primary Examiner—Georgia Y. Epps
Assistant Examiner—Kim-Kwok Chu
Attorney, Agent, or Firm—Armstrong, Westerman, Hattori, McLeland & Naughton

[57] ABSTRACT

An optical information detection circuit having first and second photodiodes (referred to as "PD") and two resistances so that a power voltage Vcc is divided by the two resistances. A potential difference between the power voltage Vcc and the connection point between the two resistances is applied as a reverse bias to the first PD, and the potential at the connection point is applied as a reverse bias to the second PD. The photomagnetic signals respectively input to the first and second PD systems of a differential optical detection system have an opposite phase relation therebetween. The first PD and second PD obtain signals from a cathode and an anode, respectively. The currents from the first PD and second PD thus have an in-phase relation, are converted into voltages by the two resistances and summed, as well as being output as a photomagnetic signal from an output terminal at the connection point.

9 Claims, 5 Drawing Sheets

OPTICAL INFORMATION DETECTION CIRCUIT FOR BY DETECTING PHOTOELECTRICALLY CONVERTED SIGNAL FROM LIGHT RECEIVING MEANS COMPRISING AT LEAST TWO LIGHT RECEIVING ELEMENTS

BACKGROUND OF THE INVENTION

1. Field of the Invention

The present invention relates to an optical information detection circuit and an optical pickup for detecting optical information recorded on an optical information recording medium by receiving the light returned from the optical information recording medium.

2. Description of the Related Art

There have recently been demands for an external storage device having a large capacity for storing a tremendous volume of information, particularly, image information or the like, with development of a computer system. Since a conventional magnetic disk used as an external storage device has a problem in that it is impossible to obtain a sufficient memory capacity and exchange mediums, various optical disk devices for storing information in optical disks have been developed.

Although such optical disk devices include a device for storing information in an additional storage type optical disk, this additional storage type optical disk is impossible to rewrite. A reloadable optical disk device such as a photomagnetic disk for photomagnetically storing information in a photomagnetic disk thus attracts attention as an external storage device.

In conventional reproduction means for reproducing information photomagnetically recorded by the photomagnetic disk device, the light reflected from a photomagnetic disk (not shown) is converged into a convergent flux by a converging lens through a beam splitter (not shown), and is caused to enter a polarized beam splitter 52, as shown in FIG. 8. The main axis of the polarized beam splitter 52 is inclined at 45°, and the polarized light entering is inclined at 45°. The light 53 passing through the polarized beam splitter 52 is polarized light having a P polarized light component only, and reflected light 54 is polarized light having an S polarized light component only. These polarized light beams are received by photodetectors 55 and 56 and converted into electrical signals.

As illustrated in FIG. 9, current outputs 57 and 58 from the photodetectors 55 and 56 are input to current/voltage converters 59 and 60 for converting into voltage signals which are supplied to a differential amplifier 61 and output as a photomagnetic information signal.

The reason for generally using a differential detection optical system comprising a differential amplifier for extracting photomagnetic information signals is that noise is decreased. The photomagnetic information signals have the following types of noise: (1) Noise generated by variations in the intensity of a light source and variations in the film surface reflectance of a medium surface; (2) noise generated by nonuniformity in the medium or on the medium surface, e.g., grain boundaries, defects, dust, etc., (3) noise generated by the unpolarized component of light which is produced due to incomplete polarization of a polarizer/analyzer; (4) noise generated by incomplete focusing or tracking; (5) shot noise of the photodetector; (6) amplifier noise; and so on.

These noises can significantly be decreased by using the differential detection optical system because the in-phase components of electric signals output from the photodetectors are cancelled. In this way, the differential detection optical system for cancelling the in-phase components of the electric signals is important for detecting the photomagnetic information signals.

However, since a conventional differential detection optical system uses a differential amplifier, the system has a problem in that the detection characteristics thereof greatly depend upon the characteristics of the differential amplifier, i.e., noise characteristics over a wide range from a low-frequency region to a high-frequency region.

For example, the photomagnetic signal detection circuit disclosed in Japanese Patent Laid-Open No. 2-206048 thus comprises a differential detection optical system which uses no differential amplifier for detecting photomagnetic information signals. The photomagnetic signal detection circuit disclosed in Japanese Patent Laid-Open No. 2-206048 uses two photodetectors which are connected in series so as to detect photomagnetic information signals by obtaining the operating output from the connection point therebetween.

However, in this differential detection optical system comprising the two photodetectors which are connected in series, since the currents of the low-frequency components of the currents generated in the two photodetectors flow into a GND or a power source through the different photodetectors, variations occur in the DC level at the connection point between the two photodetectors due to variations and unbalance in the input light, thereby causing the possibility that level variations occur in the level of the photomagnetic information signal.

SUMMARY OF THE INVENTION

An object of the present invention is to provide an optical information detection circuit and an optical pickup having a simple configuration which can precisely and stably detect optical information.

Another object of the present invention is to provide an optical information detection circuit and optical pickup having a simple configuration which can precisely and stably detect at least photomagnetic information of the photomagnetic information and preformat information which are recorded on a photomagnetic recording medium.

In order to achieve these objects, an optical information detection circuit of the present invention detects optical information recorded on an optical information recording medium by detecting the photoelectrically converted signal output from light receiving means comprising at least two light receiving elements. The optical information detection circuit comprises first voltage means for applying a reverse bias voltage to a cathode of a first light receiving element of the light receiving means, first grounding means for grounding an anode of the first light receiving element through a first earthing resistance, second voltage means for applying a reverse bias voltage to a cathode of a second light receiving element of the light receiving means through a first application resistance, second grounding means for grounding an anode of the second light receiving element, and connection means for connecting the anode of the first light receiving element and the cathode of the second light receiving element.

Other characteristics and advantages of the present invention will be made sufficiently clear in the detailed description

BRIEF DESCRIPTION OF THE DRAWINGS

FIGS. 1 to 3 relate to a first embodiment, in which FIG. 1 is a block diagram illustrating the configuration of an optical information detection circuit, FIG. 2 is a drawing illustrating an equivalent circuit of the optical information detection circuit shown in FIG. 1, and FIG. 3 is a block diagram illustrating an optical pickup comprising the optical information detection circuit shown in FIG. 1;

FIGS. 4 and 5 relate to a second embodiment, in which FIG. 4 is a block diagram illustrating an optical information detection circuit, and FIG. 4 is a drawing illustrating an equivalent circuit of the optical information detection circuit shown in FIG. 4;

FIGS. 8 and 9 relate to a conventional example, in which FIG. 8 is a block diagram illustrating the configuration of an optical system for receiving photomagnetic signals; and FIG. 9 is a block diagram illustrating the configuration of a differential optical detection system for detecting photomagnetic signals.

DETAILED DESCRIPTION OF THE PREFERRED EMBODIMENTS

Figure 3:
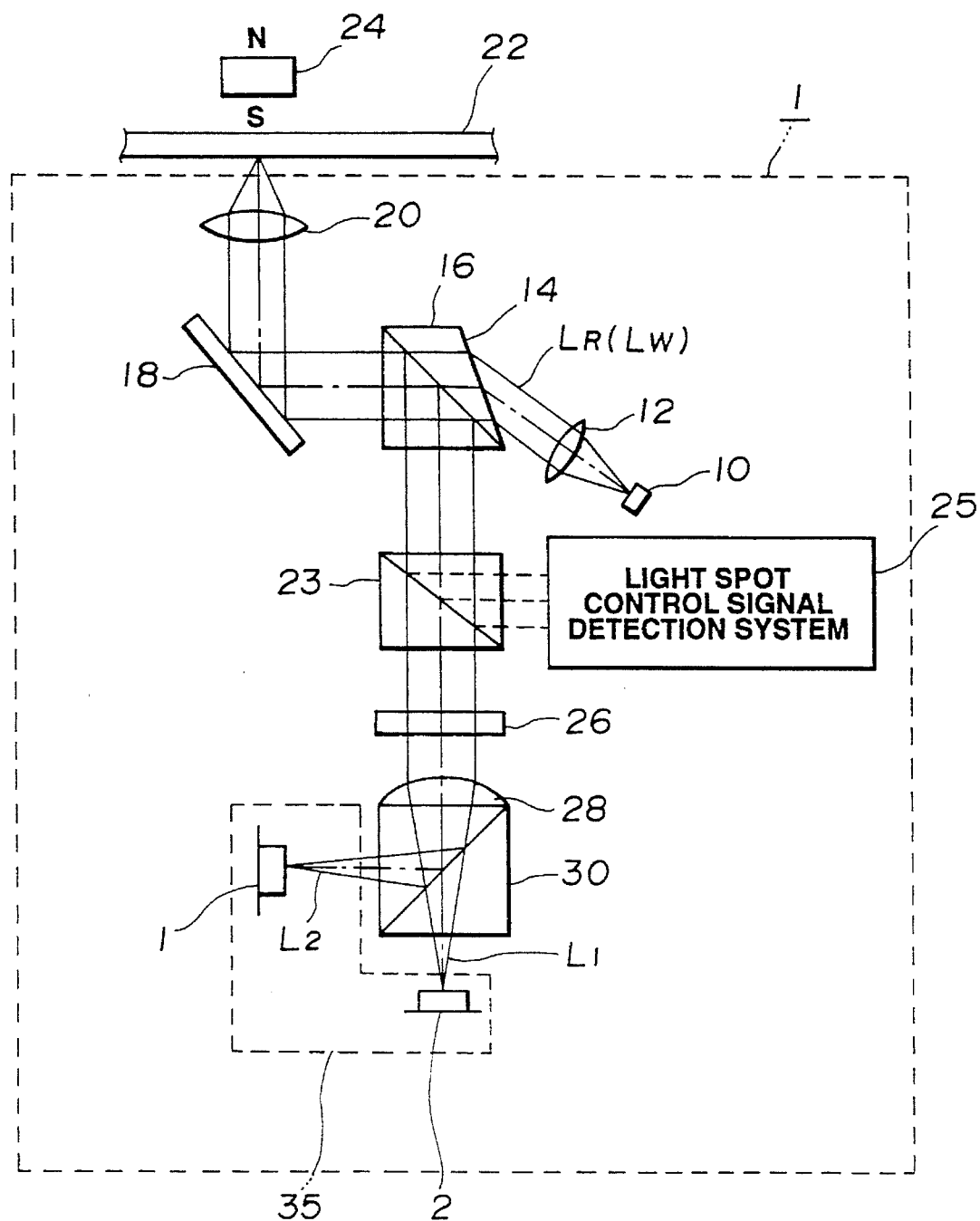

As shown in FIG. 3, in an optical pickup 1 provided with an optical information detection circuit in accordance with a first embodiment, an elliptic light beam L emitted from a semiconductor laser 10 serving as a light source is converted into a parallel flux by a collimator 12, and is obliquely applied to an incidence plane 14 of a beam splitter 16.

The semiconductor laser 10 is driven by a driving circuit (not shown) so as to generate a light beam LR having a constant light intensity therefrom during reproduction and generate a light beam LW modulated in light intensity in accordance with information to be recorded during recording. Namely, the optical beam LW having a constant intensity higher than that generated during reproduction is generated from the semiconductor laser 10 during recording.

Since the elliptic light beam LR (or LW) is obliquely applied to the incidence plane 14 of the first beam splitter 16, for example, comprising a prism body having a half mirror, the light beam LR (or LW) is converted from an elliptic beam into a circular beam in the first beam splitter 16. The light beam LR (or LW) passed through the first beam splitter 16 is reflected by the mirror 18 and then introduced into an objective lens 20. The objective lens 10 converges the beam on an information recording medium 22 such as a photomagnetic disk 22 or the like which is disposed on a turn table (not shown) rotated by driving means (not shown).

The information recording medium 22 has a recording layer, for example, made of an amorphous magnetic alloy, and concentric or spiral tracking guides which are formed in a convex or concave pattern on the surface thereof. In the recording layer of the information recording medium 22, the directions of all magnetic domains are made constant in the state where no information is recorded, and when a region is rapidly heated by applying a magnetic field, the magnetic domain of the region is reversed.

Namely, when the magnetostatic field generated from a magnet device 24 is applied to the information recording medium 22, and when the tracking guides of the information recording medium 22 are traced by the recording light beam LW during recording, a specified region is rapidly heated, and the direction of the magnetic domain of the region is reversed to record information. When the convergent light beam LR is applied to the magnetic domain region which is reversely magnetized by tracing the tracking guides by the reproducing light beam LR during reproduction, the light beam LR is reflected due to the slight rotation polarization caused by the Kerr effect.

The light beam LR reflected from the information recording medium 22 is passed through the objective lens 20, reflected by the mirror 18, introduced into the first beam splitter 16, reflected in the first beam splitter 16 and then introduced into a second beam splitter 23. The second beam splitter 23 further divides the light reflected by the first beam splitter 16 into two beam portions. One of the two beam portions enters a light spot control signal detection system 25 for detecting a focusing/tracking error signal for following the surface deflection and eccentricity of the information recording medium 22. The contents of the light spot control signal detection system 25 are not described below because they have no direct relation to the present invention.

The other of the beam portions into which the light beam is divided by the second beam splitter 23 is passed through a ½ wavelength plate 26 for increasing the ratio of the S component so that the plane of polarization is rotated for about 45°. The light beam in which the plane of polarization is rotated is converged by a converging lens 28 and is introduced into a polarized beam splitter 30 to be divided into the P polarized light component and the S polarized light component.

The light beams L1 and L2 of the P polarized component and S polarized component into which the other light beam portion is divided are respectively applied to photodiodes (referred to as "PD" hereinafter) 1 and 2 which constitute an optical information detection circuit 35 for reproducing photomagnetic signals. Namely, the light beam L1 of the P polarized component which passes through the polarized beam splitter 30 is applied to the PD 1, while the light beam reflected by the polarized beam splitter 30 is applied to the PD 2.

Figure 1:
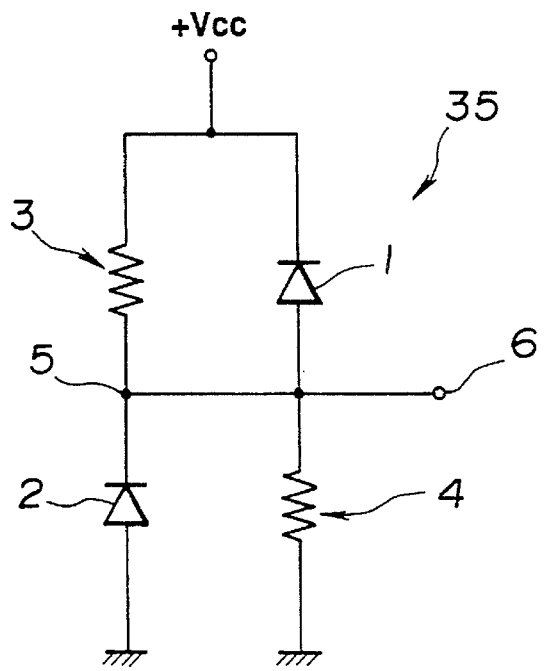

An optical information detection circuit 35 of this embodiment comprises the two PD 1 and 2 and two resistances 3 and 4, as shown in FIG. 1. A power voltage Vcc is divided by the two resistances 3 and 4, the potential of the resistance 3, i.e., the potential difference between the power voltage Vcc and the connection point 5 between the two resistances 3 and 4 being applied as a reverse bias to the PD 1, and the potential of the resistance 4, i.e., the potential at the connection point 5 being applied as a reverse bias to the PD 2.

Figure 2:
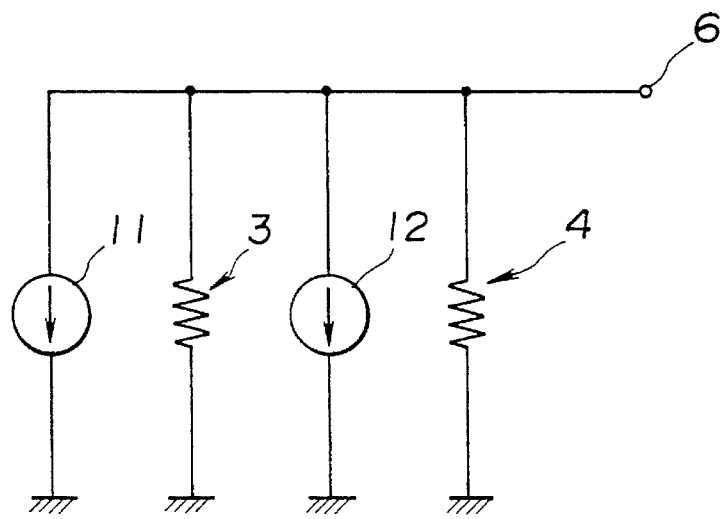

The photomagnetic signals which are respectively input to the two PD systems 1 and 2 which form a differential detection optical system have an opposite phase relation therebetween, and the PD 1 and PD 2 obtain signals from the anode and cathode, respectively. In the equivalent circuit for an alternating current of the optical information detection circuit 35 shown in FIG. 1, as shown in FIG. 2, when the PD 1 and 2 are considered as current sources 11 and 12, respectively, the phase relationship between the currents from the current sources 11 and 12 is an in-phase relationship. The currents are converted into voltages by a parallel circuit of the resistances 3 and 4 and added up, as well as being output as a photomagnetic signal from an output terminal 6.

Namely, since the photomagnetic signal components input to the two systems of PD 1 and 2 in the differential detection optical system have an opposite phase relation, noise components in an in-phase relationship are usually removed by a differential amplifier in a latter stage, and the S/N ratio is increased by totaling the photomagnetic signal components in the opposite phase relation to obtain a photomagnetic signal. However, in this embodiment, attention is paid to one of the PD 1 and 2 and the point that the current directions in the anode and cathode of the PD concerned are opposite to each other when light is applied thereto. Namely, when the phases of the signals output from the anode of one of two PD systems 1 and 2 in the differential detection optical system and from the cathode of the other are considered, since the light beams incident on the PD 1 and 2 originally have opposite phases, the opposite phase relation is changed to the in-phase relation by reversing the phase of one of the PD 1 and 2. The resistances of the signals in the in-phase relation are totaled to produce a photomagnetic signal.

Since the optical information detection circuit of the first embodiment comprises the two PD 1 and 2 and the two resistances 3 and 4, the photomagnetic signal can be detected by a simple circuit configuration. Further, since the currents generated in the two PD 1 and 2 flow into the GND or the power source through the resistances, the DC level of the terminal 6 as the connection point between the two PD 1 and 2 is constant, and a photomagnetic information signal having a stable level can thus be obtained.

A second embodiment of the present invention is described below. Since the second embodiment is substantially the same as the first embodiment, only different portions are described.

Figure 4:
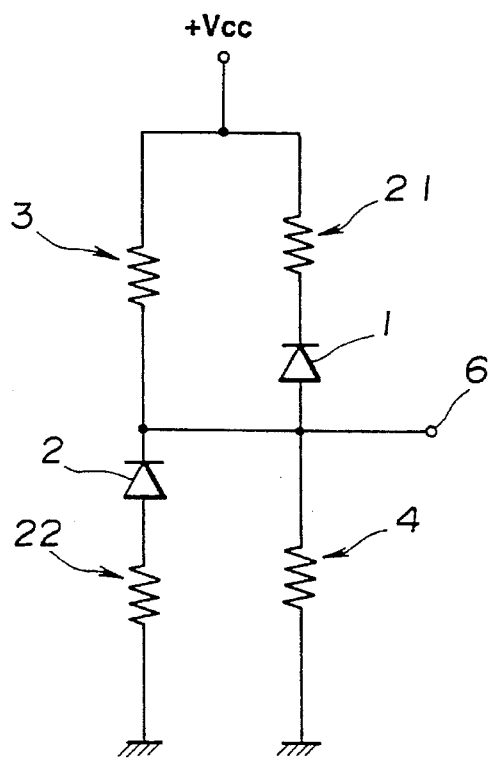
Figure 5:
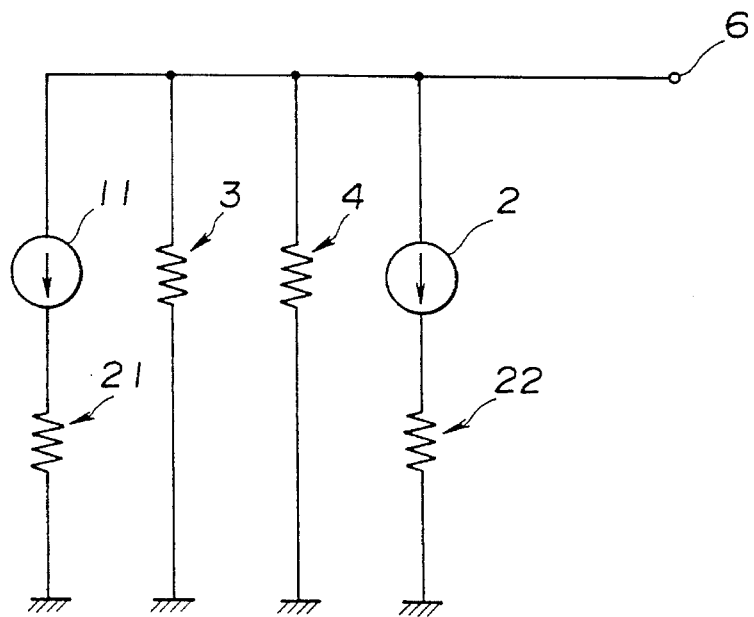

An optical information detection circuit of the second embodiment comprises resistances 21 and 22 which are connected in series to the PD 1 and 2, respectively, as shown in FIG. 4. An equivalent circuit of this optical information detection circuit is shown in FIG. 5. Other components and operations are the same as in the first embodiment.

In the optical information detection circuit of the second embodiment configured as described above, the current on the cathode side of the PD 1 and the current on the anode side of the PD 2 are converted into voltages by the resistances 21 and 22, respectively, and then taken out. In the first embodiment, a servo error signal and so on different from the photomagnetic signals such as the focusing and tracking error signal and the like are produced in the light point control signal detection system 25. However, the configuration of the second embodiment enables the servo error signal and the like to be output in a signal system independent of the photomagnetic signals.

A third embodiment is described below. Since the third embodiment is substantially the same as the first embodiment, only different portions are described.

Figure 6:
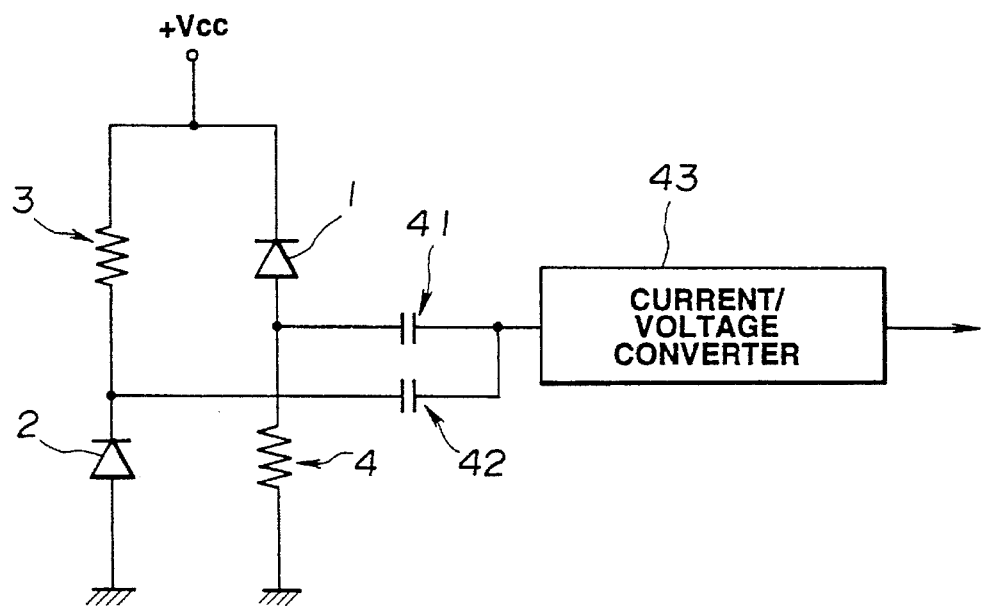
FIG. 6 is a block diagram illustrating an optical information detection circuit in accordance with a third embodiment.

In an optical information detection circuit of the third embodiment, the anode of the PD 1 is not directly connected to the cathode of the PD 2, and the reverse bias voltages applied to the PD 1 and 2 are the power voltage+Vcc, as shown in FIG. 6. The anode of the PD 1 is connected to a current/voltage converter 43 through a capacitor 41, and the cathode of the PD 2 is also connected to the current/voltage converter 43 through a capacitor 42. In this embodiment, since the input impedance of the current/voltage converter 43 is sufficiently low, the photomagnetic signal currents generated in the PD 1 and 2 hardly flow through the resistances 3 and 4, but flow into the current/voltage converter 43 through the capacitor 41 or 42.

In the first (FIG. 1) or second (FIG. 2) embodiment, the reverse bias voltages applied to the PD 1 and 2 are obtained by dividing the power voltage at a resistance ratio between the resistances 3 and 4. If the power voltage+Vcc is a predetermined potential or greater, no problem occurs. However, for example, if the power voltage is lower than+Vcc, the reverse bias voltages applied to the PF 1 and 2 are insufficient, thereby raising the probability that satisfactory frequency characteristics cannot be obtained. Namely, when the photomagnetic signal currents generated in the PD 1 and 2 are output as voltage signals, satisfactory frequency characteristics cannot be obtained due to the low-pass filter formed by the capacity between the terminals of the PD 1 and 2 and the resistances. In the third embodiment, unlike the first embodiment, the power voltage+Vcc is not divided, and the reverse bias voltages applied to the PD 1 and 2 consist of the power voltage+ Vcc, thereby preventing occurrence of the above problem and deterioration in the frequency characteristics.

The second embodiment can, of course, be applied to the third embodiment. The effects of the second embodiments can be added to the third embodiment by application of the second embodiment.

A fourth embodiment is described below. Since the fourth embodiment is substantially the same as the first embodiment, only different portions are described below.

In the information recording medium 22 such as a photomagnetic disk or the like, preliminary information such as track address, selector address, etc., pre-format signals, are formed as pits in a convex or concave pattern, as described above. The pre-format signals are detected as a sum of the signals input to the PD 1 and 2 in the in-phase relation.

Figure 7:
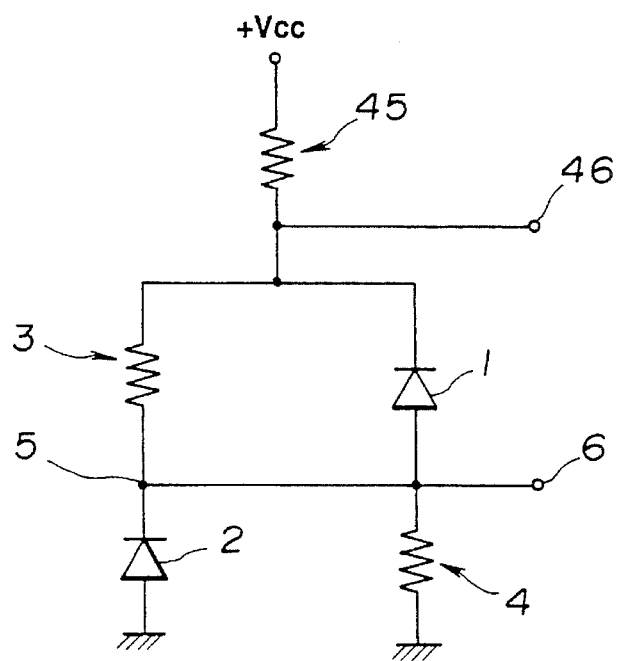
FIG. 7 is a block diagram illustrating an optical information detection circuit in accordance with a fourth embodiment.

An optical information detection circuit of the fourth embodiment, as shown in FIG. 7, thus comprises a resistance 45 added to the power source+Vcc side of the first embodiment (refer to FIG. 1). This configuration causes a signal in proportion to the sum of the photoelectric currents generated in the PD 1 and 2, i.e., the pre-format signal, to be output from the output terminal 46. The other components and operations are the same as in the first embodiment.

The optical information detection circuit of the fourth embodiment has not only the same effects as those obtained in the first embodiment but also the effect of permitting the pre-format signal to be detected as an in-phase signal by a simple configuration.

Although this embodiment comprises the in-phase signal detection resistance 45 provided on the power source side in order to detect the in-phase signals of the PD 1 and 2, the configuration is not limited to this, and the in-phase signals of the PD 1 and 2, i.e., the pre-format signals, can also be detected by providing the in-phase signal detection resistance 45 on the ground side.

The fourth embodiment can be applied to not only the first embodiment but also the second embodiment (FIG. 4) and the third embodiment (FIG. 6). Namely, each of the first to third embodiments has the same configuration as that of the fourth embodiment, i.e., the configuration in which the in-phase detection resistance 45 can be provided on either the power source side or the ground side. This has the same effect as that described above, i.e., the effect of permitting the pre-format signals to be detected as the in-phase signals by a simple configuration.

Although each of the above embodiments relates to a case where the embodiment is applied to detection of photomagnetic signals, the embodiments are not limited to this, and each of the embodiments can, of course, be applied to the light point control signal detection system 25 (refer to FIG. 3) provided with two PD systems for generating the servo error signal by differential operation in place of a conventional differential operation means applied to the light point control signal detection system 25.

Figure 8:
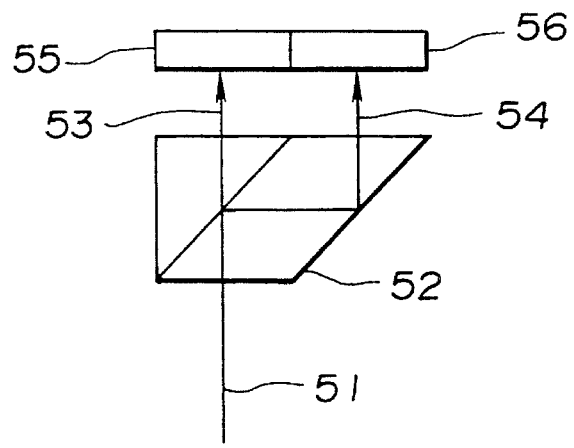
Figure 9:
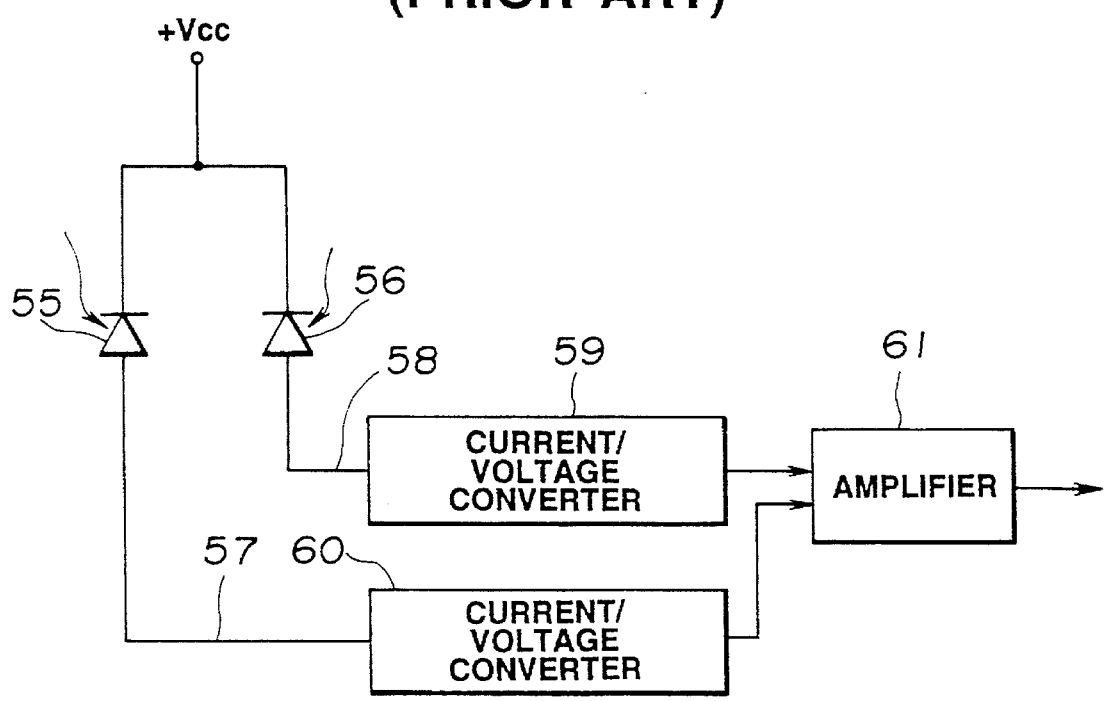

Further, in each of the embodiments, the polarized beam splitter 30 and the PD 1 and 2 may be configured as shown in FIG. 8.

In the present invention, it is obvious that different embodiments can be constructed within a wide range on the basis of the present invention without departing from the spirit and the scope of the present invention. The present invention is limited only by the attached claims, and is not limited by specified embodiments.

What is claimed is:

1. An optical information detection circuit for detecting optical information recorded on an optical information recording medium by detecting photoelectrically converted signals output from light receiving means comprising at least two light receiving elements without using a differential amplifier, said optical information detection circuit comprising:

voltage means for applying a first reverse bias voltage to a cathode of a first light receiving element of said light receiving means and a second reverse bias voltage to a cathode of a second light receiving element of said light receiving means through a biasing resistance;

first grounding means for grounding an anode of said first light receiving element through a grounding resistance;

second grounding means for grounding an anode of said second light receiving element; and connection means for at least electrically connecting the anode of said first light receiving element and the cathode of said second light receiving element.

2. An optical information detection circuit according to claim 1, wherein said connection means comprises:

a first capacitor having one end electrically connected to the anode of said first light receiving element; and a second capacitor having one end electrically connected to the cathode of said second light receiving element, the other end being connected to the other end of said first capacitor;

wherein the anode of said first light receiving element and the cathode of said second light receiving element are electrically connected.

3. An optical information detection circuit according to claim 2, further comprising current/voltage conversion means connected to the outside terminal on the side of connection between said first capacitor and said second capacitor.

4. An optical information detection circuit according to any one of claims 1, 2 and 3, wherein said first voltage means applies a reverse bias voltage to the cathode of said first light receiving element of said light receiving means through a second resistance, and said second grounding means grounds the anode of said second light receiving element through a second grounding resistance.

5. An optical information detection circuit according to claim 4, wherein said first voltage means and said second voltage means, or said first grounding means and said second grounding means apply reverse voltages or a ground potential through a common resistance.

6. An optical information detection circuit according claims 1 or 2, wherein optical information recorded on said optical information recording medium include at least photomagnetic information photomagnetically recorded, a photoelectrically converted signal detected by said first light receiving element is a signal photoelectrically converted by a light beam having a first polarized component of the light returned from said optical information recording medium containing said photomagnetic information, and a photoelectrically converted signal detected by said second light receiving element is a signal photoelectrically converted by a light beam having a second polarized light component polarized in the direction vertical to the light beam containing said first polarized component of the returned light.

7. An optical information detection circuit according to claim 5, wherein optical information recorded on said optical information recording medium includes at least photomagnetic information photomagnetically recorded thereon, wherein a photoelectrically converted signal detected by said first light receiving element is a signal photoelectrically converted by a light beam having a first polarized component of the light returned from said optical information recording medium containing said photomagnetic information, and wherein a photoelectrically converted signal detected by said second light receiving element is a signal photoelectrically converted by a light beam having a second polarized light component polarized in the direction vertical to the light beam containing said first polarized component of the returned light.

8. An optical pickup comprising an optical information detection circuit of claim 6 comprising:

separation means for separating the light returned from said optical information recording medium containing said photomagnetic information into a light beam having a first polarized light component, and a light beam containing a second polarized light component polarized in the direction vertical to the light beam of said first polarized light component of said returned light.

9. An optical pickup according to claim 8, further comprising irradiation means for irradiating said optical information recording medium with a light beam.

* * * * *